ian Patent [19]
Lassmann et al.

[11] 3,724,980
[45] Apr. 3, 1973

[54] APPARATUS FOR CUTTING OUT FORMS FROM A RIBBON OF DOUGH

[75] Inventors: Heribert Lassmann; Rudolf Woog, both of Kempen, Germany

[73] Assignee: Maschinenfabrik Briem-Hengler & Cronemeyer K.G., Krefeld, Germany

[22] Filed: Aug. 11, 1971

[21] Appl. No.: 170,825

[30] Foreign Application Priority Data

Dec. 19, 1970 Germany..................P 20 62 745.6

[52] U.S. Cl. ..................425/102, 425/299, 425/306, 425/316
[51] Int. Cl.............................................B29c 17/10
[58] Field of Search......425/215, 331, 298, 299, 306, 425/315, 316, 101, 102, 301, 307, 308

[56] References Cited

UNITED STATES PATENTS

| 2,991,735 | 7/1961 | Worner | 425/298 X |
| 3,592,129 | 7/1971 | List | 425/215 X |
| 3,680,419 | 8/1972 | Stoop | 83/98 |
| 3,404,607 | 10/1968 | Feick et al. | 93/61 A |
| 3,103,842 | 9/1963 | Winkler et al. | 83/300 X |
| 3,379,102 | 4/1968 | James et al. | 93/61 A |

Primary Examiner—J. Spencer Overholser
Assistant Examiner—David S. Safran
Attorney—Herbert E. Kidder

[57] ABSTRACT

Apparatus for cutting out dough forms having inner cutouts from a ribbon of traveling dough. Parts of the apparatus include a first pair of rollers, a second pair of rollers spaced apart from the first pair and an endless carrier belt which supports the ribbon of dough and conveys it between each of the pairs of rollers. Each of the pairs of rollers is made up of a cutting roller, with punching elements around its periphery, and a contact pressure roller. The punching elements on the cutting roller of the first pair of rollers cut out the inner cutouts of the dough forms from the traveling ribbon of dough and the punching elements on the cutting roller of the second pair of rollers cut out the outer shapes of the dough forms. When the carrier belt conveys the ribbon of dough between each pair of rollers, the contact pressure roller is in pressure contact with the cutting edges of the punching elements of the cutting roller of that pair. The punching elements on the cutting roller of the first pair of rollers retain the inner cutouts of the dough forms as they roll away from contact with the ribbon of dough, and a blower positioned adjacent that roller blows these inner cutouts into the interior of the roller through openings in the roller wall. A trough shaped conveyor belt in the roller removes the inner cutouts as they accumulate during operation of the apparatus.

17 Claims, 7 Drawing Figures

APPARATUS FOR CUTTING OUT FORMS FROM A RIBBON OF DOUGH

This invention relates to apparatus for cutting out forms for baking from a ribbon of dough.

It is known to cut out the whole form in one operation from the ribbon of dough by means of a cutting roller, wherein the inner holes of the form, for example of a pretzel, are drawn into the cutout punches, while the finished forms are withdrawn from the cutout punches of the roller by means of a suction tape. The cutting roller itself is divided into a suction chamber and a pressure chamber so that during the rotation of the roller, the inner cutouts pass to a zone of the pressure chamber and are thereby pushed out of the punched out forms.

This known method has the disadvantage that in the case of folds in the ribbon of dough the volume of dough in the finished forms may be excessive. Consequently, the finished forms can no longer be pushed out of the punches owing to the high compression of the dough. During the next revolution of the roller, the repeated impression of the already filled punching out elements into the ribbon of dough leads to a further compression of the dough, necessitating the stopping of the whole machine for cleaning the affected punch or punches.

The present invention provides apparatus for cutting out dough forms having inner cutouts therein from a ribbon of dough travelling from a first roller pair to a second roller pair comprising a first roller pair having a cutting roller and a contact pressure roller for the passage of the dough ribbon between said roller pair and for cutting out the inner cutouts of the dough forms; a second roller pair spaced apart from said first roller pair having a cutting roller and a contact pressure roller for the passage of the dough ribbon therebetween and for cutting out the outer shapes of the dough forms; the cutting roller of each of said roller pairs having punching elements on the periphery thereof, said contact pressure roller being in pressure contact with cutting edges of the punching elements of the cutting roller; means for removing pieces of dough cut out by the first roller pair cutting roller; and carrier means for the dough ribbon during the passage thereof between said first and second roller pairs wherein the dough ribbon is supported by the carrier means in contact with the first roller pair in the direction of travel of the dough ribbon.

The inner cutouts punched into the ribbon of dough may either be taken out of the ribbon after the same has left the first pair of rollers, or they may be received directly by the punching elements and then withdrawn therefrom during further rotation of the roller. In the first case, they may be removed for example, by blowing out. Another possibility comprises wetting the carrier web having a smooth and preferably watertight surface prior to mounting the ribbon of dough and deflecting the carrier web, downstream of the first pair of rollers, downwardly and away from the ribbon of dough. Due to the wetting, the adhesion between the ribbon of dough and the carrier web is sufficient for the inner cutouts to stick to the carrier web rearwardly of the first pair of rollers in the direction of travel of the dough ribbon and they are thereby withdrawn from the ribbon of dough. In the second case, i.e. where the inner cutouts are retained by the punching elements, they can also be blown out. If this withdrawal is unsuccessful, the inner cutouts located in the punching element are pushed into the roller during the next cutting rotation thereof and are removed from there. Thus, the actual dough forms are not damaged by the punching elements remaining filled, contrary to the known method, and the functioning of the apparatus is not interrupted.

For removing the inner cutouts remaining in the punching elements of the first roller pair cutting roller, the invention provides that the punched out pieces (inner cutouts) are blown into the interior of the rollers and removed from there. With this apparatus it is improbable that even with strongly compressed dough would remain in the punching element because it is automatically pushed into the interior of the roller.

According to a further feature of the invention, for separating the ribbon of dough from the finished cutout baking forms downstream of the second pair of rollers, the still coherent ribbon of dough is lifted off of the supporting web so that only the finished dough forms remain on the supporting web.

The punching elements of the first roller pair cutting roller may converge toward the cutting edges thereof, while the punching elements of the second roller pair cutting roller diverge towards cutting edges thereof. In this manner, the inner cutouts punched out by the first roller pair cutting roller are reliably retained in the punching elements and can easily be pushed into the interior of the cutting roller. The configuration of the punching elements of the second roller pair cutting roller ensures that the dough forms do not stick to the punching elements but remain on the carrier means.

If, on the other hand, the inner cutouts punched into the ribbon of dough are to be withdrawn only after leaving the first roller pair, the punching elements of this first pair of rollers also diverge towards cutting edges thereof. In this manner, the inner cutouts do not remain in the punching elements, but remain in the ribbon of dough until the carrier means is deflected downstream of the first pair of rollers.

A stationary blowing device with a blowing jet directed radially towards the periphery of the first roller pair cutting roller is provided for blowing out the dough pieces punched out by the first pair of rollers, when these pieces are retained in the punching elements.

This blower may be mounted as desired outside the zone of the radial segment over which the dough ribbon embraces the cutting roller, or within the zone of the segment. In the latter case, the carrier means must obviously be deflected away from the ribbon or dough in this zone, or two carrier webs may be provided, of which one terminates upstream of the blower and the second starts downstream of the blower. Furthermore, according to the invention, the inner cutouts blown into the cutting roller of the first pair of rollers are transported away by a conveyor belt located within the cutting roller, and having preferably a curved configuration. Preferably, the curve is concentric with the axis of the cutting roller. Furthermore, the side of the conveyor belt frame opposite the blower may form a baffle projecting above the conveyor trough. This baffle serves to collect parts of dough blown into the interior of the roller, so that they are reliably collected by the conveyor. Preferably, also this side edge of the conveyor belt frame, forming the baffle plate, is concentric with the axis of the cutting roller.

If, the inner cutouts punched into the web of dough, are not retained by the punching elements but remain in the ribbon, a blowing device may be mounted preferably between the first and second pairs of rollers in which blowing jet or jets are directed vertically onto the ribbon of dough, or the inner cutouts. Preferably the blower is mounted above the ribbon of dough, at a point where the ribbon of dough is not supported by the carrier means. This may be achieved by two separate carriers means of which one ends in front of the blower, and the other starts behind the blower. Otherwise, the carrier means may be guided in the zone of the blower in such a manner that the ribbon of dough is not supported along the zone. Below the unsupported ribbon of dough there is preferably a conveyor belt for removing the inner cutouts blown out of the ribbon of dough.

If the inner cutouts punched into the ribbon of dough are to be removed by a wetted carrier web, the carrier web may also be deflected, rearwardly of the first pair of rollers, from the ribbon of dough or two separate carrier means may be provided, leaving a gap between the end of the first and the start of the second carrier means, so that the ribbon of dough is unsupported for a short distance. For wetting the carrier web, an application roller extending over the width of the carrier web and dipping into a tank containing liquid may be provided thereby ensuring continuous and uniform wetting.

Finally, the counter pressure rollers for the punching out rollers may act as drive rollers for the carrier means.

The invention will now be described, by way of example, with reference to the accompanying drawings, in which.

Figure 1:
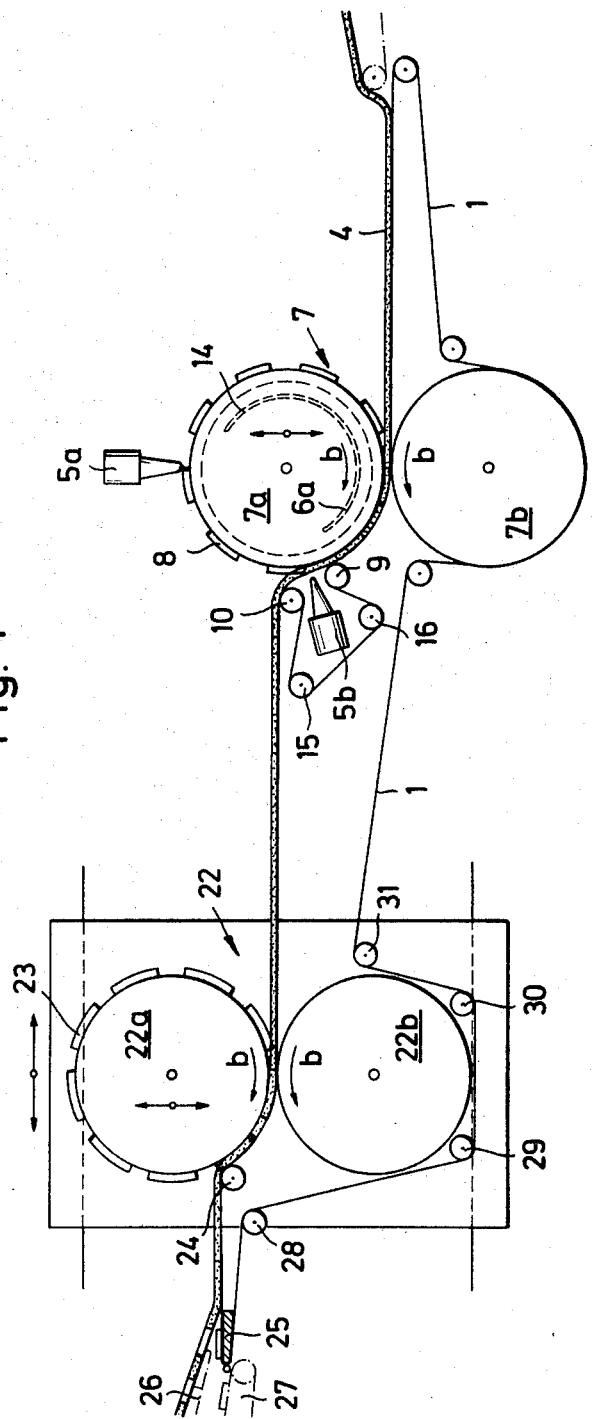
FIG. 1 shows a diagrammatical longitudinal cross-section of apparatus according to the invention with a single supporting web for a ribbon of dough.
Figure 2:
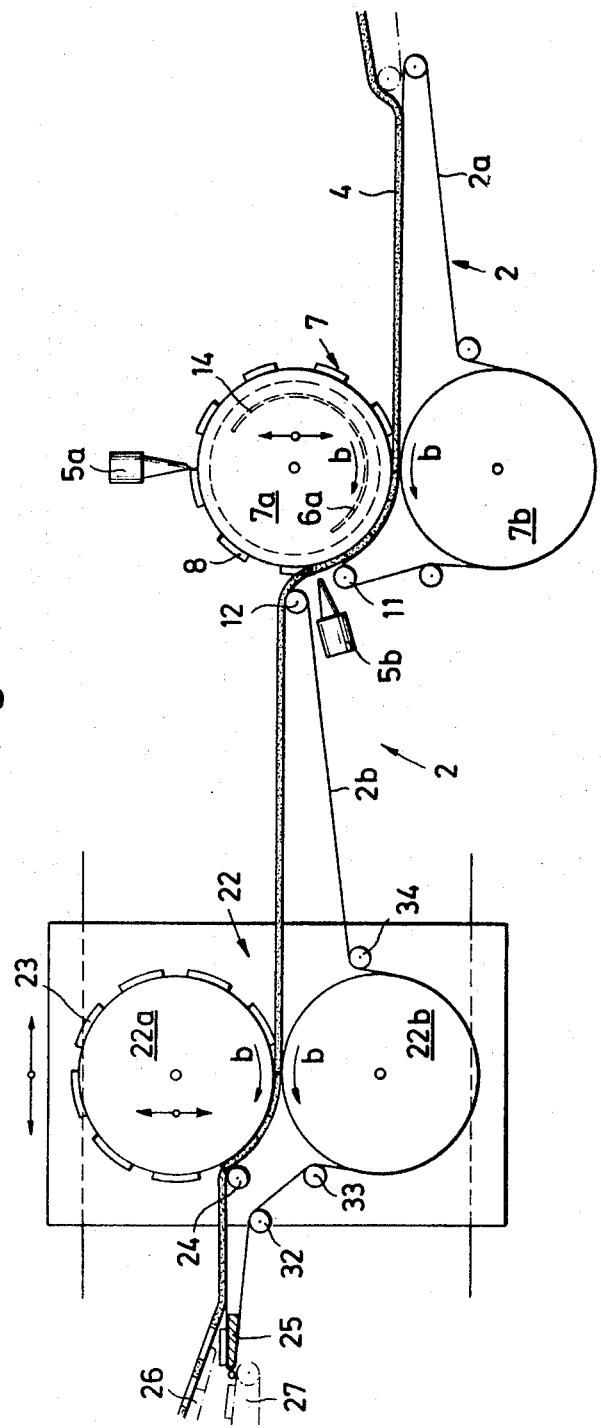
FIG. 2 is a drawing corresponding to FIG. 1 but with two separate carrier webs for the ribbon of dough.

The embodiments differ in principle only by a different guide for carrier webs 1, 2 and 3 for a ribbon of dough 4; The arrangement of blowing devices 5a, 5b and 5c and a wetting device 5 d for removing inner cutouts 4a of the forms to be baked from the ribbon of dough 4; and in the arrangement of conveyor belts 6a and 6b for carrying away inner cutouts 4a from the ribbon of dough 4. Apart from that, all other parts are marked with the same reference numerals in all the embodiments.

According to FIGS. 1 to 4, the ribbon of dough 4 reaches, on the carrier web 1, 2, 3, a first pair of rollers 7 with rollers 7a and 7b which revolve in the directions of the arrows b. The roller 7b is a contact pressure roller and the roller 7a is a cutting roller and carries punching elements 8 (see FIG. 5) with which inner cutouts or holes 4a, for example of a pretzel, are punched into the ribbon of dough 4. For this purpose each punching element 8 has recesses 8a, 8b, 8c, corresponding to the inner cutouts 4a of the shapes to be baked, the sizes of which converge toward punching or cutting edges 8a', 8b', 8c', (FIG. 6), or diverge towards cutting edges 8a'', 8b'', 8c'', (FIG. 7). In addition, each punching element 8 has embossing strips 8b for embossing the shapes to be baked.

After the ribbon of dough 4 has passed through a gap between the pair of rollers 7, it remains in contact with the roller 7a by means of a suitable guide of the supporting web 1, 2, 3 by guide rollers 9, 10 or 11, 12, or 13, over a radial segment spanning an angle of about 45°.

Figure 5:
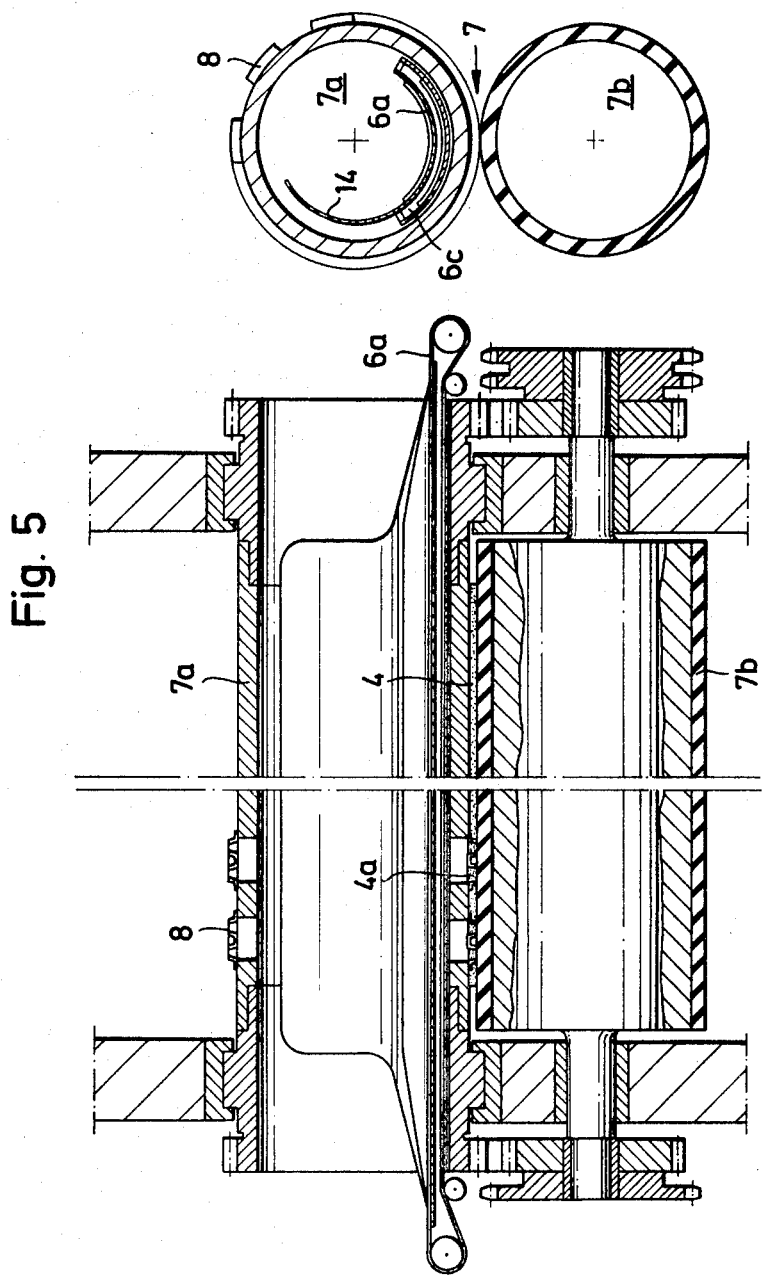
FIG. 5 is a vertical cross-section of a first pair of rollers of the apparatus of FIGS. 1 and 2.

The inner cutouts 4a punched into the ribbon of dough 4 may be removed from the ribbon of dough 4 in different ways. Thus, according to FIG. 1 to 3, blowing devices 5a or 5b or 5c are provided. The blowing device 5a is located outside the zone of the radial segment over which the cutting roller is embraced by the ribbon of dough, above the roller 7a. The jet or jets are directed radially onto the outer periphery of the cutting roller 7a, and the cutouts 4a of the ribbon of dough 4 to be blown out. These blowing jets remove the inner cutouts 4a, withdrawn by the punching elements 8 from the ribbon 4, and blow them into the hollow roller 7a, where they drop on a trough-shaped conveyor belt 6a (FIG. 5). This conveyor belt 6a has a baffle plate 14 which extends upwardly beyond the conveyor belt channel 6c.

Both the baffle plate 14 and the trough-shaped conveyor belt 6a have a radius of curvature concentric with the axis of roller 7a.

The baffle plate 14 is of special importance if a blowing device or devices 5b are provided (instead of or in addition to the blowing device 5a) located within the zone of the radial segment, i.e., substantially opposite the baffle plate 14. With this arrangement of the blowing devices 5b, care must be taken that the ribbon of dough 4 is free, i.e. unsupported by the carrier webs 1 or 2. This may be achieved either by deflecting the carrier web 1 over guide rollers 9, 10, 15, 16 or by providing two carrier webs 2a and 2b, wherein the carrier web 2a terminates upstream of the blowing device 5b (guide roller 11) and the carrier web 2b starts downstream of the blowing device 5b (guide roller 12).

Figure 6:
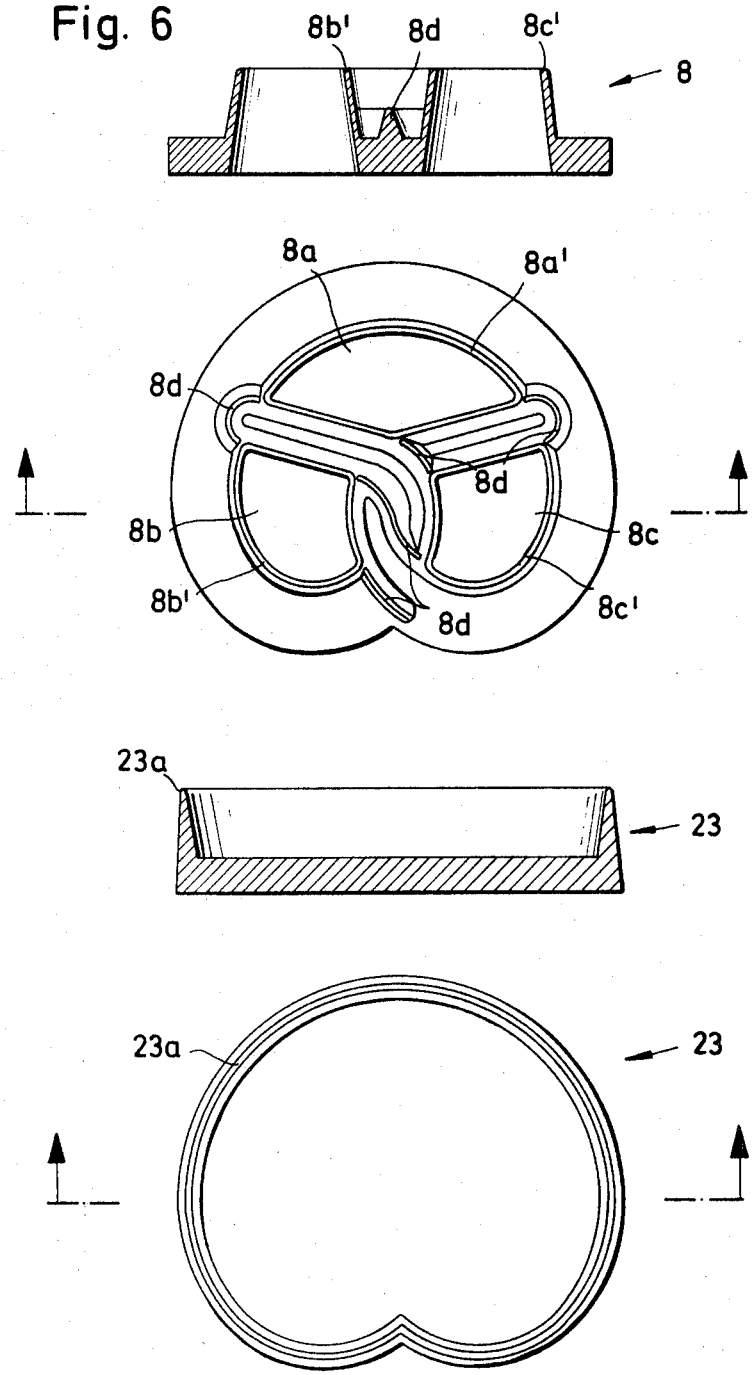
FIG. 6 and 7 show punching elements of cutting rollers of first and second roller pairs respectively, in plan view and in cross-section.
Figure 7:
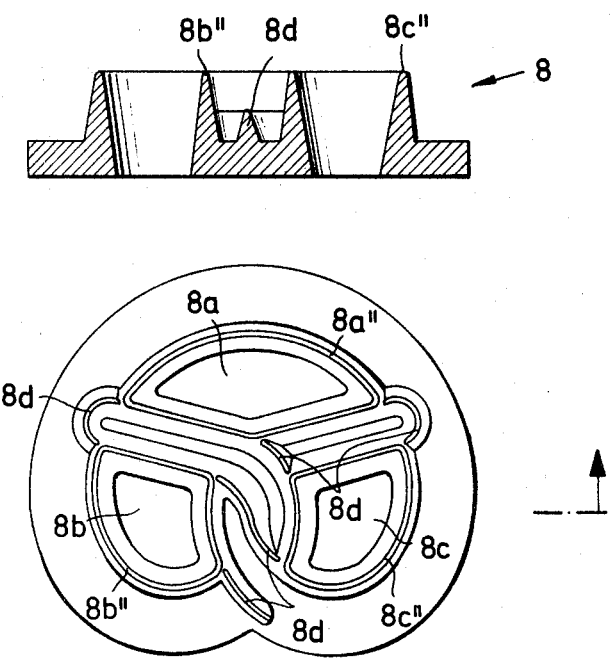

In the arrangement with blowing devices 5a and 5b, the punching elements of FIG. 6 converge towards their cutting edges 8a', 8b', 8c'.

Figure 3:
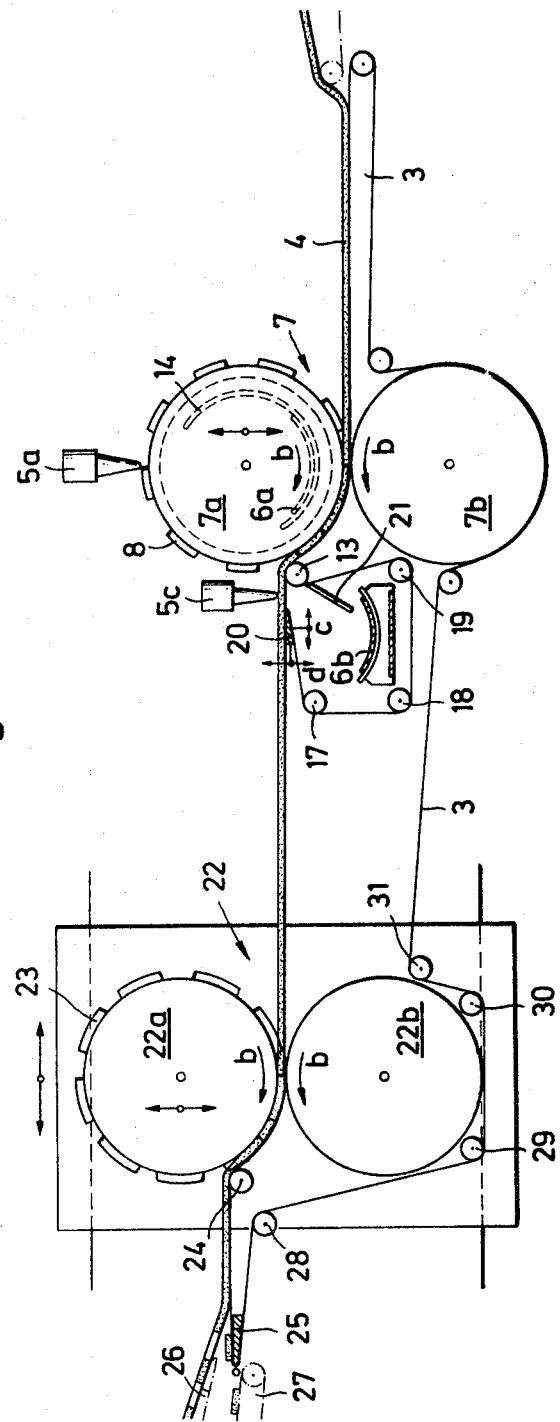
FIG. 3 shows another embodiment of the apparatus according to the invention with one carrier web, also in diagrammatical and longitudinal cross-section.
Figure 4:
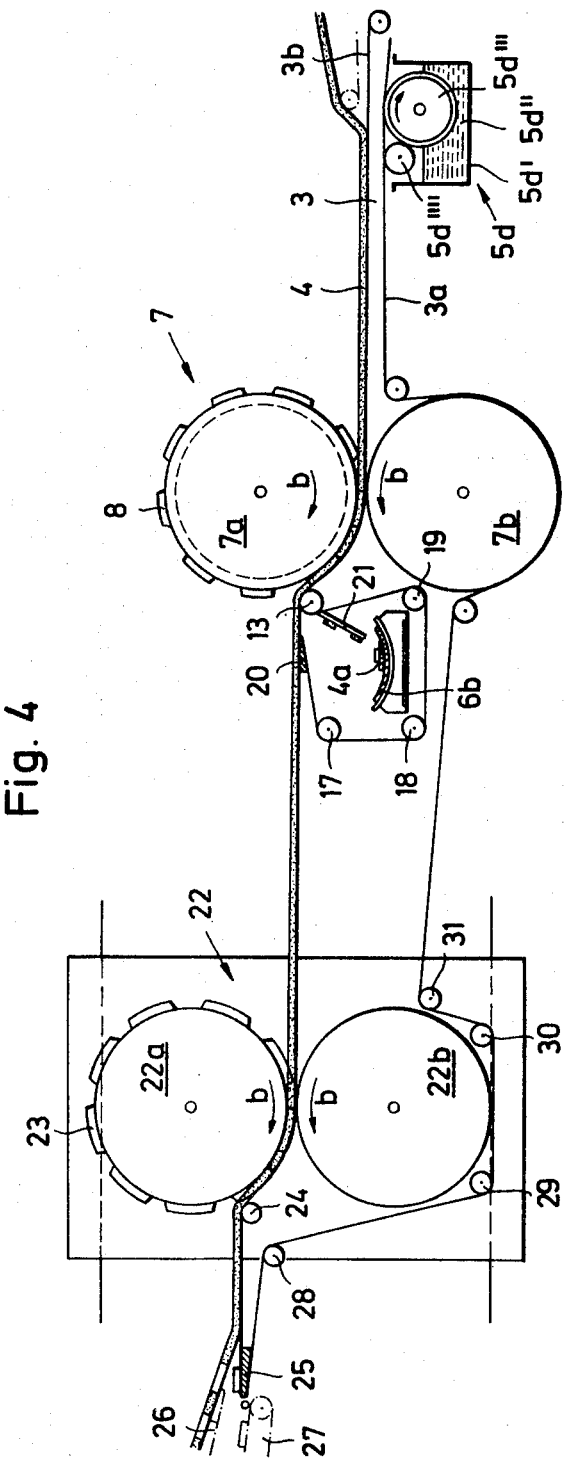
FIG. 4 is a diagrammatical longitudinal cross-section of a further embodiment of apparatus according to the invention.

As shown in FIG. 3, it is also possible to replace the blowing device 5b with a blowing device 5c, arranged downstream of the radial segment, i.e., behind the guide roller 13. This blowing devide 5c blows from the top onto the ribbon of dough 4 and expels thereby the inner cutouts 4a from the ribbon of dough 4. Obviously, also in this arrangement, in the zone of the blowing device 5c, the ribbon of dough 4 must be unsupported by the carrier web 3, to enable the inner cutouts 4a to be pushed out by a jet of air. In the embodiment shown, this is achieved by guide rollers 13, 17, 18, 19 and a deflecting wedge 20 displaceable in the direction of arrows c and d. However, the same effect may also be achieved by two supporting webs as in FIG. 2, of which one ends upstream of the blowing device 5c, and the other downstream thereof.

Inside the loop formed by the carrier web 3 by the guide rollers 13, 17, 18, 19 and the wedge 20, there is a conveyor belt 6b for removing the blown out inner cutouts 4a. The construction of the conveyor belt 6b corresponds substantially to that of the conveyor belt 6a. To ensure that the parts of dough drop reliably on to the conveyor belt 6b, a baffle plate 21 may also be provided. Naturally, in this arrangement of the blowing device 5c, the parts of dough must not be removed from the ribbon 4 by the punching out elements 8. This may be achieved by the recesses 8a, 8b, 8c of the punching elements 8 diverging conically towards the cutting edges 8a'', 8b'', 8c'' (FIG. 7).

The removal of the inner cutouts 4a may also be achieved by providing the carrier web 3 with a smooth surface which is wetted, instead of the blowing device 5c. Owing to the wetting of the carrier web 3, the adhesion of the ribbon of dough 4 is so great that the inner cutouts 4a remain on the carrier web 3 when the same is deflected by the roller 13, and may be removed by a stripper plate 21. The wetting is achieved by a wetting device 5d. This consists of a tank 5d', filled with liquid 5d'' into which dips a revolving roller 5d''', resting against the surface of the carrier web in the reverse run. In this manner, the carrier web 3 is continuously wetted. In order to ensure uniform wetting, a squeeze roller 5d'''' is provided which rests on the application roller 5d'''. The carrier web 3, wetted in this manner, receives, after deflection into the forward 3b, the ribbon of dough 4 to be processed.

During the further run of the carrier web 1, 2, 3, the ribbon of dough 4 reaches a second pair of rollers 22 with rollers 22a and 22b. Roller 22b forms a contact pressure roller while the roller 22a carries cutting elements 23. These cutting elements 23, form the outer profile of the shapes to be baked, each having a closed diverging cutting edge 23a (FIG. 6). Because of the divergence of cutting edges 23a, the cut-out shapes are not received into the cutout elements and are carried along on the roller 22a. Also here, the carrier webs 1, 2 and 3 are guided over the guide rollers 24 in such a manner that the roller 22a is slightly looped by the ribbon of dough 22. Behind the guide roller 24, the carrier web reaches a deflecting wedge 25. Above the deflecting wedge 25 there is a conveyor belt 26 and in the extension of the deflecting wedge or of the carrier web 1, 2, 3 there is a conveyor belt 27. The upper conveyor belt 26 receives and removes the remaining skeleton of the ribbon of dough, while the finished shapes to be baked remain on the carrier web 1, 2, or 3 and pass to the conveyor belt 27.

According to whether or not one carrier web 1 or 3 or two carrier webs 2a and 2b are provided, the drive rollers 7b may serve as single drive rollers for the carrier webs, or the roller 22b may be an additional drive roller. In the former case, the carrier webs 1 and 3 may pass over deflecting rollers 28, 29, 30 and 31 about the roller 22b without resting thereagainst, while in the second case the carrier web 2b may be guided over deflecting rollers 32, 33 and 34, so that it rests flush on the roller 22b.

While we have shown and described in detail two illustrative embodiments of the invention, it will be understood by those skilled in the art that the invention is not limited to these specific arrangements, but may take various other forms.

We claim:

1. Apparatus for cutting out dough forms having inner cutouts therein from a ribbon of dough travelling from a first roller pair to a second roller pair comprising: a first roller pair having a cutting roller and a contact pressure roller for the passage of the dough ribbon through a gap between said rollers and for cutting out the inner cutouts of the dough forms; a second roller pair spaced apart from said first roller pair having a cutting roller and a contact pressure roller for the passage of the dough ribbon therebetween and for cutting out the outer shapes of the dough forms; the cutting roller of each of said roller pairs having punching elements with cutting edges on the periphery thereof, said contact pressure roller being in pressure contact with said cutting edges of the punching elements of the cutting roller; means for removing pieces of dough cut out by the first roller pair cutting roller; and carrier means for the dough ribbon during the passage thereof between said first and second roller pairs wherein the dough ribbon is supported by the carrier means in contact with the first roller pair cutting roller over a radial segment of said cutting roller rearwardly of the dough ribbon passage gap in the first roller pair in the direction of travel of the dough ribbon.

2. Apparatus according to claim 1 wherein said radial segment extends over a radial angle of between 0° and 45°.

3. Apparatus according to claim 1 wherein the punching elements of the cutting roller of the first roller pair are provided with embossing formations adjacent the cutting edges thereof for embossing an upper surface of the dough ribbon during its passage between the first roller pair.

4. Apparatus according to claim 1 wherein the punching elements of the first roller pair cutting roller converge towards cutting edges thereof for retaining punched-out pieces of dough within said punching elements and wherein blowing means directed radially onto the periphery of the first roller pair cutting roller is provided for blowing said punched-out piece of dough into a hollow of said first roller pair cutting roller.

5. Apparatus according to claim 4 wherein said blowing means is directed to a portion of the periphery outside the radial segment of the first roller pair cutting roller.

6. Apparatus according to claim 4 wherein at least a part of said blowing means is directed onto a portion of the periphery inside the radial segment of the first roller pair cutting roller, the carrier means of the dough ribbon being deflected away from said portion of the periphery.

7. Apparatus according to claim 1 wherein the punching elements of the first roller pair cutting roller diverge toward the cutting edges thereof for leaving punched-out dough pieces behind on the carrier means, blowing means directed onto a portion of the dough ribbon rearwardly of the first roller pair in the direction of travel of the dough ribbon being provided for blowing said punched out dough pieces out of the dough ribbon, the dough ribbon carrier means being deflected away from said portion of the dough ribbon.

8. Apparatus according to claim 1 wherein the punching elements of the first roller pair cutting roller diverge toward the cutting edges thereof, wetting means being provided for the carrier means forwardly of the first roller pair in the direction of travel of the dough ribbon to increase adhesion of the dough ribbon to the carrier means to allow the punched-out dough pieces to be separated from the dough ribbon when the carrier means is deflected away from the direction of travel of the dough ribbon.

9. Apparatus according to claim 1 wherein the punching elements of the second roller pair cutting roller diverge toward cutting edges thereof.

10. Apparatus according to claim 4 wherein a conveyor belt is provided inside the first roller pair cutting roller for removing the blown out dough pieces in the hollow of said cutting roller.

11. Apparatus according to claim 10 wherein the conveyor belt has a curved shape and has a radius of curvature concentric with the first roller pair cutting roller.

12. Apparatus according to claim 11 wherein a baffle plate is provided for the conveyor belt, said baffle plate being provided opposite at least a part of said blowing means and extending circumferentially beyond the conveyor belt.

13. Apparatus according to claim 12 wherein the baffle plate is curved and has a radius of curvature concentric with the radius of curvature of the conveyor belt.

14. Apparatus according to claim 7 wherein two seperate carrier means are provided, one terminating forwardly of said blowing means directed onto the dough ribbon and the other starting rearwardly of said blowing means.

15. Apparatus according to claim 7 wherein a conveyor belt is provided below the carrier means for removing blown out pieces of dough.

16. Apparatus according to claim 1 wherein the contact pressure rollers serve as drive means for the carrier web.

17. Apparatus according to claim 1 wherein lifting means is provided rearwardly of the second roller pair in the direction of travel of the dough ribbon for lifting the dough ribbon from the dough ribbon carrier means so that the finished dough forms remain on the carrier means.

* * * * *